3,658,879
PROCESS FOR THE PREPARATION OF
CHRYSANTHEMIC ACID
Marc Julia, Paris, France, assignor to Rhone-Poulenc,
Paris, France
No Drawing. Filed Oct. 9, 1967, Ser. No. 673,929
Int. Cl. C07c *69/74, 171/48;* C07f *3/02*
U.S. Cl. 260—468 P                               8 Claims

ABSTRACT OF THE DISCLOSURE

Chrysanthemic acid, its lower alkyl esters and nitrile are made by decarboxylating an acid of the formula:

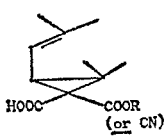

---

The present invention relates to the preparation of chrysanthemic acid.

Some chrysanthemic acid esters as pyrethrins, cinerins, allethrins and furethrins are very interesting insecticides, because of their high insecticidal activity and their low toxicity to man and other warm-blooded animals. Chrysanthemic acid has two stereoisomeric forms, i.e., cis, and trans forms, and the esters of the trans acid have a generally greater activity than esters of the cis form.

Hitherto, chrysanthemic acid has been prepared by hydrolysis of rethrins of natural origin or by the synthesis of Staudinger et al. [Helvetica Chimica Acta (1924) 7, p. 390], developed by Campbell et al. [J. Chem. Soc. (1945), p. 283]. However, this synthesis, which starts with the reaction of ethyl diazoacetic with 2,5-dimethyl-hexa-2,4-diene, and leads to a mixture of the cis (*dl*)- and trans (*dl*)-chrysanthemic acids, is fairly delicate because of the instability of ethyl diazoacetate. The resultant danger renders its industrial application very complex.

A similar synthesis, in which ethyl diazoacetate is replaced by diazoacetonitrile, leads to the pure trans (*dl*)-chrysanthemic acid, but involves even greater dangers than the previous one.

By other processes (French Pats. Nos. 1,269,127, 1,356,954 and 1,356,949), it is possible to prepare chrysanthemic acid by cyclisation, followed by saponification of compounds of the formulae:

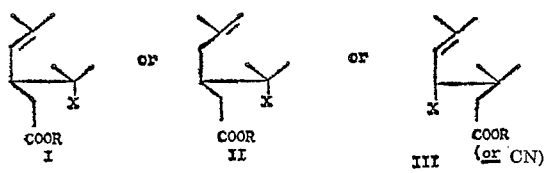

in which R represents a lower alkyl radical and X represents a halogen atom or sometimes an acyloxy group. The synthesis of the intermediate compounds of Formula I starts with isobutylideneacetone and a bromoacetic ester. For the synthesis of compounds of Formula II, methallyl alcohol and an enol ether of levulinic ester are used as starting materials. The compounds of Formula III may be obtained from an acetal of dimethylacrolein and an alkylisobutenylether, or form β-alkoxyisovaleraldehyde and ethyl isopropylidene malonate (or cyanacetate).

The present invention provides a new process for the preparation of chrysanthemic acid, using a 1-phenylthio-3-methyl-but-2-ene and an alkyl malonate (or cyanaace-tate) as initial starting materials, which may be diagrammatically represented as follows:

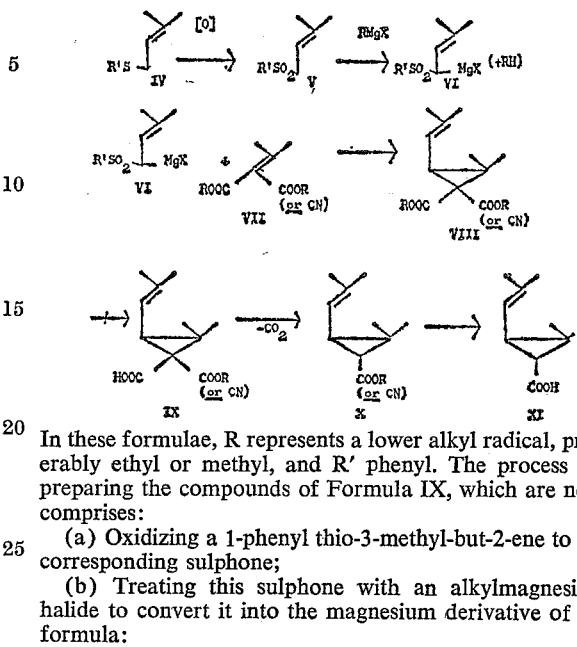

In these formulae, R represents a lower alkyl radical, preferably ethyl or methyl, and R' phenyl. The process for preparing the compounds of Formula IX, which are new, comprises:

(a) Oxidizing a 1-phenyl thio-3-methyl-but-2-ene to the corresponding sulphone;

(b) Treating this sulphone with an alkylmagnesium halide to convert it into the magnesium derivative of the formula:

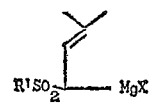

in which R' represents phenyl;     (VI)

(c) Adding to the magnesium derivative thus obtained a malonic or cyanacetic ester of the formula:

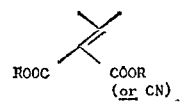

(VII)

in which R represents a lower alkyl radical, and hydrolysing the product of this condensation to produce the isomeric compounds of the formulae:

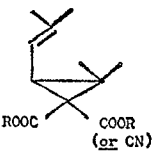 and 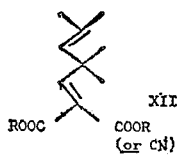

(d) Separating the cyclopropane isomer from this mixture of isomers;

(e) Partially saponifying the cyclopropane compound with an alcoholic solution of alkali metal hydroxide in the cold; and (f) Isolating the cyclopropane derivative of the formula:

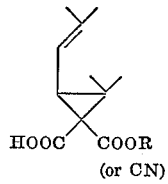

(IX)

The sulphide of Formula IV is prepared, e.g., as indicated in J. Chem. Soc. (1953), p. 3555, and oxidised to the sulphone. The usual method of converting sulphides into sulphones may be used, notably the action of an aqueous hydrogen peroxide solution on a solution of the sulphide in a mixture of acetic acid and acetic anhydride. The preparation of the magnesium derivative of Formula VI takes place by the action of an alkylmagnesium halide, for example ethylmagnesium bromide, on the sulphone in an appropriate solvent. After the addition of the sulphone of Formula V to the magnesium derivative RMgX, the mixture may be moderately heated to complete the reaction (i.e. until the end of the evolution of the compound RH, for example ethane). The condensation of the magnesium derivative of Formula VI with isopropylidene malonate (or cyanacetate) of Formula VII is then carried out in the medium employed in the preparation of the compound of Formula VI itself, and is followed by hydrolysis on ice in the presence of an acid, by the methods usually adopted in syntheses with organomagnesium derivatives.

When the condensation of the compounds of Formulae VI and VII has thus been effected in a solvent such as tetrahydrofuran, a crude product is obtained consisting of 95% of the compound of Formula VIII, the remainder being an isomeric derivative of the formula:

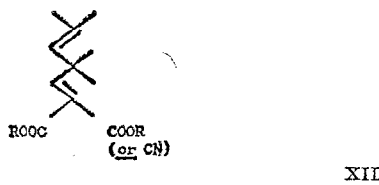

XII

This condensation may be carried out in the presence of a copper salt, in which case the yield of mixture of isomeric derivatives is about 75%, or in the absence of such a copper salt, the total crude ester yield then being somewhat lower.

If, instead of an ether such as tetrahydrofuran, the solvent employed as reaction medium is diethyl ether, optionally mixed with a hydrocarbon, for example with an aromatic hydrocarbon such as benzene, optionally in the presence of a copper salt (for example cuprous chloride), a mixture of the isomeric compounds of Formulae VIII and XII is also obtained, but in this case the proportion of the compound of Formula XII becomes preponderant and may represent from 50% to 75% of the crude mixture, which is itself obtained in a yield of about 50%.

The orientation of the reaction towards the formation of the compound of Formula VIII or XII depends upon the basicity and the polarity of the solvent, the use of highly basic and highly polar solvents favouring the formation of the compound of Formula VIII. If compound of Formula VIII is accompanied by an appreciable proportion of the compound of Formula XII the two constituents are separated from one another. The compound of Formula VIII, obtained by either of the above methods, is then subjected to controlled saponification with an alcoholic solution of an alkali metal hydroxide in the cold (10–20° C.). There is thus obtained the corresponding compound of Formula IX which is isolated.

The compounds of Formula IX are decarboxylated by heating in the presence of copper powder in a quinoline base. A crude chrysanthemic ester or crude chrysanthemic nitrile is thus obtained, which may be saponified to the acid either directly or after further treatments. The ester of Formula X obtained is a mixture of cis and trans isomers in substantially equal proportions, which may be almost completely converted into the trans isomer by heating in an alcoholic solution of an alkali metal alcoholate (for example sodium ethoxide). The nitrile of Formula X obtained by decarboxylation, on the other hand, is for the greater part the trans isomer.

The following examples illustrate the invention:

EXAMPLE 1

(a) To a solution of 70 g. of 1-phenylthio-3-methyl-but-2-ene in 400 cc. of a mixture of acetic anhydride and acetic acid in equal proportions, cooled by means of a mixture of ice and salt, are added with stirring 108 cc. of aqueous 30%, w./v.) hydrogen peroxide solution; the operation is carried out so as to maintain the temperature of the mixture at about 0° C. The mixture is then left overnight without cooling and 800 cc. of water are added. The sulphone precipitates and is separated, washed and dried in vacuo. There are thus obtained 70 g. (85% yield) of phenyl (3-methyl-buten-2-yl (sulphone, M.P. 51–52° C.

(b) Ethylmagnesium bromide is prepared from 14.4 g. of ethyl bromide in 30 cc. of anhydrous tetrahydrofuran (THF), which is added to 3 g. of magnesium covered with THF. A solution of 20 g. of the preceding sulphone in 100 cc. of anhydrous THF is then added, and the mixture is then heated on the water bath until the evolution of ethane ceases. 16 g. of ethyl isopropylidene malonate and 600 mg. of copper acetate are added, and the whole is diluted with 30 cc. of anhydrous THF. The product is left overnight, hydrolysed on ice in the presence of ammonium chloride, and extracted with diethyl ether. The ethereal solution is washed with water, and dried over sodium sulphate, the ether is evaporated and the product is distilled. 16.1 g. of product are thus obtained which, according to vapour phase chromatography, consists of 95% of 1,1-diethoxycarbonyl-2,2-dimethyl-3-isobuten-yl cyclopropane.

(c) To 10.2 g. of the preceding product are added 2 g. of potassium hydroxide in 40 cc. of absolute ethyl alcohol, and the product is left at ambient temperature (20–25°c.) for 10 days. 6.2 g. of 1-ethoxycarbonyl-2,2-dimethyl-3-isobuten-yl cyclopropane carboxylic acid are thus obtained, and 2.6 g. of unconverted diester are recovered.

(d) A mixture of 973 mg. of the preceding semi-ester, 9 cc. of 2,4-dimethyl-quinoline and 500 mg. of copper powder is heated for 6 hours at 155° C. After cooling, the product is extracted with diethylether and washed with a dilute aqueous hydrochloric acid solution and then with an aqueous sodium bicarbonate solution, the ether is evaporated and the residue is filtered through a small silica column. 545 mg. of product are thus obtained which, according to chromatographic analysis, consists of 90% of a mixture of cis and trans ethyl chrysanthemate (respective proportions 43% and 57%).

(e) 1.72 g. of crude ethyl chrysanthemate, prepared as indicated in the foregoing, is heated for 72 hours under reflux in an ethanolic sodium ethoxide solution (1.5 g. of Na in 30 cc. of ethanol). After the usual separating treatments, 932 mg. of neutral fraction consisting of trans ethyl chrysanthemate and 493 mg. of an oily acid fraction containing chrysanthemic acid, are obtained.

On saponification of the 932 mg. of trans ester (by reflux for 4 hours in an ethanolic solution of 500 mg. of potassium hydroxide), 650 mg. of chrysanthemic acid, M.P. 48–51° C., are obtained.

EXAMPLE 2

By the foregoing procedure (Example 1b), replacing the 16 g. of ethyl isopropylidene malonate by 11.6 g. of ethyl isopropylidene cyanacetate, 8.2 g. of 1-cyano-1-ethoxycarbonyl-2,2-dimethyl-3 - isobutenyl cyclopropane, are obtained, the ester group of which is then saponified by the action of potassium hydroxide insolution in ethanol in the cold (for 11 days). 7.5 g. of 1-cyano-1-carboxy-2, 2-dimethyl-3-isobutenyl-cyclopropane are thus obtained. 2.2 g. of this acid are decarboxylated by the procedure previously adopted for the semi-ester, 1.6 g. of product consisting of 90% of chrysanthemic nitrile (80% of trans, 20% of cis) are thus obtained. 1.35 g. of this crude nitrile is saponified by the action of 0.65 of potassium hydroxide in 9 cc. of ethylene glycol by heating under reflux for 18 hours. After the usual extracting treatments, 1.4 g. of oily product is obtained, which is distilled under a very good vacuum to separate the chrysanthemic acid therefrom.

EXAMPLE 3

(a) Ethylmagnesium bromide is prepared from 14.4 g. of ethyl bromide and 3 g. of magnesium, the operation being carried out in diethyl ether, and 20 g. (0.1 mol) of phenyl(3-methyl-buten-2-yl) sulphone (prepared as indicated in Example 1) mixed with 100 cc. of anhydrous benezene are added. When the addition is complete, the mixture is heated on the water bath until the evolution of ethane ceases. A suspension is obtained which is added to 10 g. of ethyl isopropylidene malonate (0.05 mol) and 150 mg. of cuprous chloride in 20 cc. of anhydrous benzene, and the mixture is heated 2 hours at 70° C. The product is hydrolysed on ice acidified with 2 N hydrochloric acid and the organic layer is separated, washed to neutrality with water and dried over anhydrous sodium sulphate. 8 g. of product distilling at 90–98° C./0.1 mm. Hg. are thus obtained. By vapor chromatography, this product is separated into two constituents:

1,1-diethoxycarbonyl1-2,2-dimethyl - 3 - isobutenyl - cyclopropane, B.P. 80–84° C./0.2 mm. Hg, which on saponification gives a diacid melting at 122–123° C.;

Ethyl 2-ethoxycarbonyl-4,4,6-trimethyl - hepta - 2,5 - dienoate, B.P. 105–110° C. /0.2 mm. Hg, which on saponification gives the corresponding diacid melting at 151–153° C.

The proportion of the two diesters in this experiment is ⅓ of cyclopropane diester to ⅔ of dienic diester.

The cyclopropanic ester when treated as indicated in Example 1 is converted into chrysanthemic acid.

I claim:

1. A cyclopropane derivative of the formula:

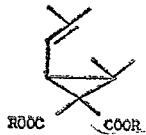

in which R represents lower alkyl.

2. 1,1-diethoxycarbonyl-2,2-dimethyl - 3 - isobutenyl-cyclopropane.

3. A cyclopropane derivative of the formula:

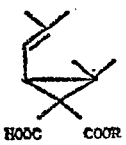

in which R represents lower alkyl.

4. 1-ethoxycarbonyl - 2,2 - dimethyl - 3 - isobutenyl-cyclopropane carboxylic acid.

5. Process for the preparation of a cyclopropane derivative of the formula:

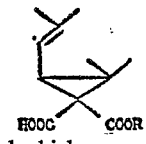

where R is lower alkyl which comprises:

(a) oxidizing a 1-phenyl thio-3-methyl-but-2-ene to the corresponding sulphone;

(b) treating this sulphone with an alkylmagnesium halide to convert it into the magnesium derivative of the formula:

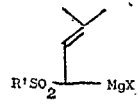

in which R' represents phenyl;

(c) adding to the magnesium derivative thus obtained a malonic acid of the formula:

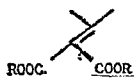

in which R represents a lower alkyl radical, and hydrolysing the product of this condensation to produce the isomeric compounds of the formulae:

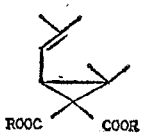 and 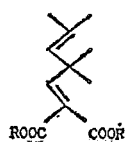

(d) separating the cyclopropane isomer from this mixture of isomers;
(e) partially saponifying the cyclopropane compound with an alcoholic solution of alkali metal hydroxide in the cold; and
(f) isolating the cyclopropane derivative of the formula:

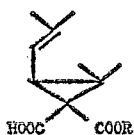

6. Process according to claim 5, wherein the preparation of the magnesium derivative of the sulphone and its condensation with malonic ester are carried out in tetrahydrofuran or in diethyl ether.

7. Process according to claim 6, wherein a copper salt is added to the reaction medium at the time of the addition of the malonic ester.

8. Process according to claim 7, wherein the copper salt is copper acetate or cuprous chloride.

References Cited

UNITED STATES PATENTS 3,445,499   5/69   Martel et al. _____ 260—464

OTHER REFERENCES

Kharash et al "Grignard Reactions of Non-Metallic Substances," 1954, p. 563.
McFarland et al., J. Org. Chem. 30, 2003 (1965).
Truce et al., J. Am. Chem. Soc. 74, 2881 (1952).
Kaiser et al. C. A. 63, 14979d, 1965.

LORRAINE A. WEINBERGER, Primary Examiner

R. GERSTL, Assistant Examiner

U.S. Cl. X.R.

260—404, 465.4, 485 R, 514 P, 607 A

PO-1050
(5/69)

UNITED STATES PATENT OFFICE
CERTIFICATE OF CORRECTION

Patent No. 3,658,879          Dated April 25, 1972

Inventor(s) MARC JULIA

It is certified that error appears in the above-identified patent and that said Letters Patent are hereby corrected as shown below:

In the heading, insert -- Claims priority,

France    79723       October 12, 1966
France    96478       February 24, 1967. --

Col. 1, line 24, insert -- such -- before "as"

line 37, for "diazoacetic" read -- diazoacetate -- line 71, for "cyanaace" read -- cyanace --.

Col. 4, line 8, before "w/v" insert -- ( -- line 14, replace "(" (second occurrence) by -- ) -- line 75, insert -- g. -- after "0.65"

Col. 5, line 24, delete "l" after "carbonyl"

Signed and sealed this 26th day of September 1972.

(SEAL)
Attest:

EDWARD M. FLETCHER, JR.
Attesting Officer

ROBERT GOTTSCHALK
Commissioner of Patents